(12) United States Patent
Dubach

(10) Patent No.: US 6,799,663 B2
(45) Date of Patent: Oct. 5, 2004

(54) DAMPING MEANS, IN PARTICULAR FOR FURNITURE

(75) Inventor: Fredi Dubach, Bäretwil (CH)

(73) Assignee: Julius Blum Gesellschaft m.b.H., Höchst (AT)

( * ) Notice: Subject to any disclaimer, the term of this patent is extended or adjusted under 35 U.S.C. 154(b) by 0 days.

(21) Appl. No.: 10/144,885

(22) Filed: May 15, 2002

(65) Prior Publication Data

US 2002/0170794 A1 Nov. 21, 2002

(30) Foreign Application Priority Data

May 17, 2001 (AT) .......................... A 784/2001
Nov. 26, 2001 (AT) ....................... A 1847/2001

(51) Int. Cl.⁷ ................................................ F16F 9/00
(52) U.S. Cl. ............................ 188/322.22; 188/322.17
(58) Field of Search ................................ 267/286, 292, 267/293, 64.11, 64.13, 64.14, 153, 145; 188/317, 301, 312, 316, 322.16, 322.17, 322.22; 16/67, 78, 79, 80, 74, 84, 85, 86, 66; 277/585

(56) References Cited

U.S. PATENT DOCUMENTS

| 4,110,868 A | * | 9/1978 | Imazaike ..................... 16/84 |
| 4,303,250 A | * | 12/1981 | Persson ..................... 277/585 |
| 4,817,238 A | | 4/1989 | Liu |
| 4,838,393 A | | 6/1989 | Mourray et al. |
| 4,877,226 A | | 10/1989 | Taylor |
| 5,157,806 A | * | 10/1992 | Wartian ....................... 16/66 |
| 5,163,204 A | * | 11/1992 | Jackson ....................... 16/84 |
| 5,201,512 A | | 4/1993 | Rabin |
| 5,257,680 A | | 11/1993 | Corcoran et al. |
| 5,471,708 A | | 12/1995 | Lynch |
| 5,720,369 A | | 2/1998 | Thorn |
| 6,006,873 A | | 12/1999 | Kirst |
| 6,119,832 A | * | 9/2000 | Hofmann ............... 188/322.17 |

FOREIGN PATENT DOCUMENTS

| AT | 002276 U1 | 8/1998 |
| DE | 2 238 595 | 2/1974 |
| DE | 3542700 A1 | 6/1986 |
| DE | 4319641 A1 | 12/1993 |
| DE | 19642806 C1 | 1/1998 |
| DE | 19702628 A1 | 4/1998 |
| GB | 1 269 055 | 3/1972 |
| GB | 1 467 043 | 3/1977 |
| GB | 1 543.712 | 4/1979 |
| WO | 89/05388 | 6/1989 |

* cited by examiner

Primary Examiner—Robert A. Siconolfi
Assistant Examiner—Melanie Torres
(74) Attorney, Agent, or Firm—Wenderoth, Lind & Ponack L.L.P.

(57) ABSTRACT

In an item of furniture having a movable furniture part, such as a drawer, door or folding part, a damping apparatus damps movement of the movable furniture part. The damping apparatus is constructed as a negative-pressure damping apparatus or combined pressurized and negative-pressure damping apparatus. It has a piston (3) and a resiliently deformable piston part (6) in the piston rod (4). This resiliently deformable piston part (6) is pressed against the cylinder wall during the damping procedure.

24 Claims, 12 Drawing Sheets

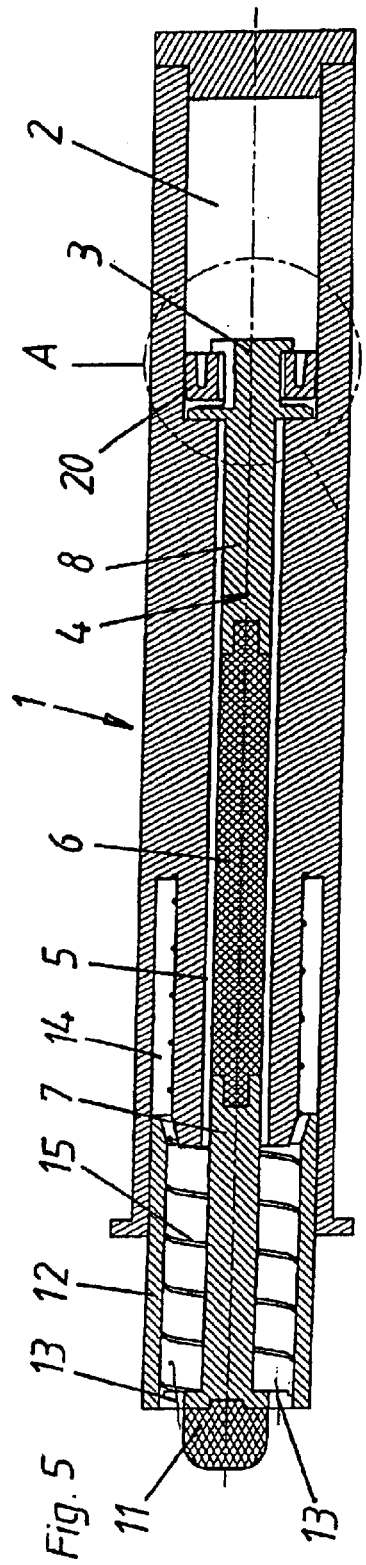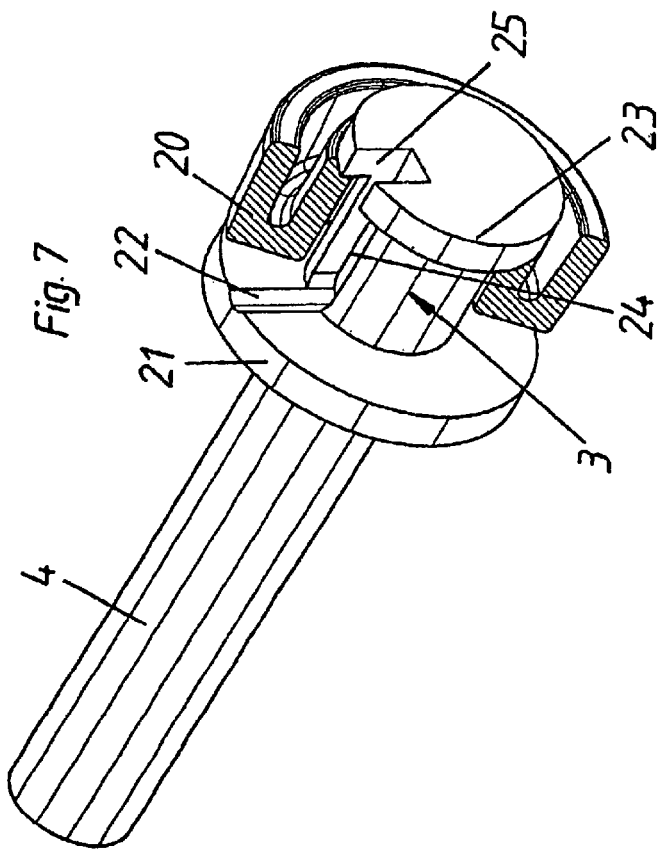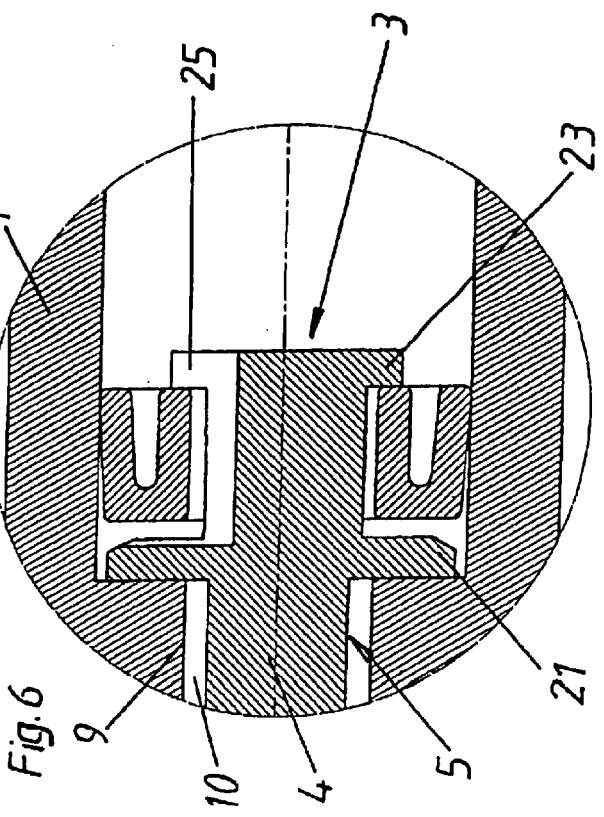

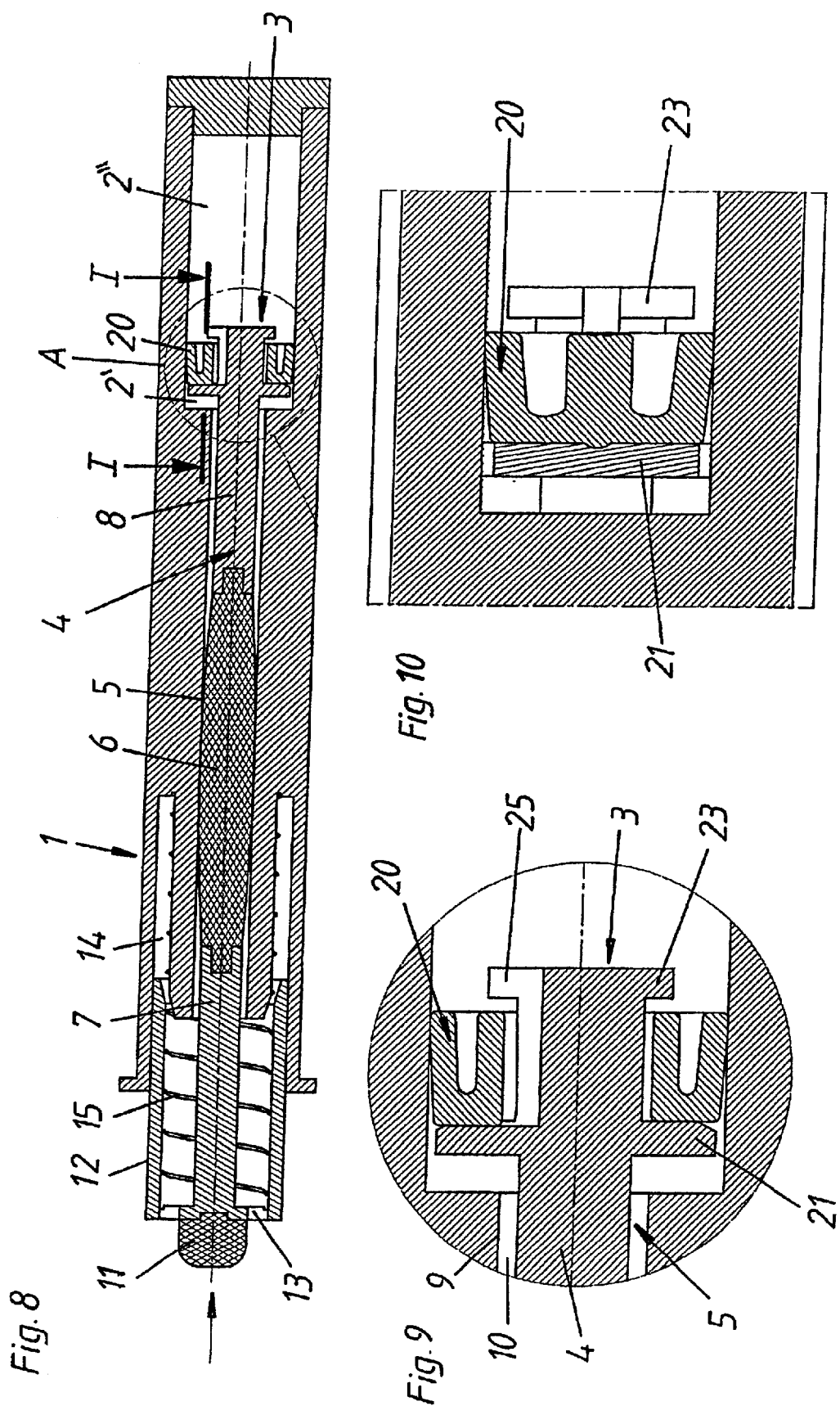

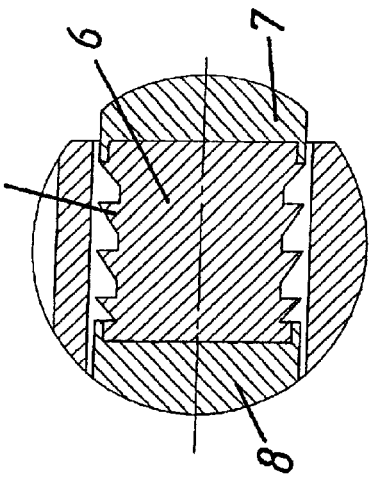
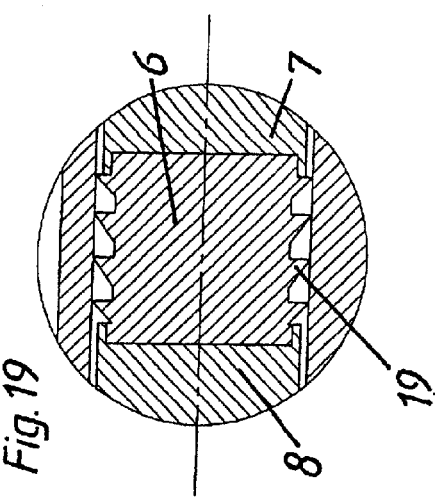
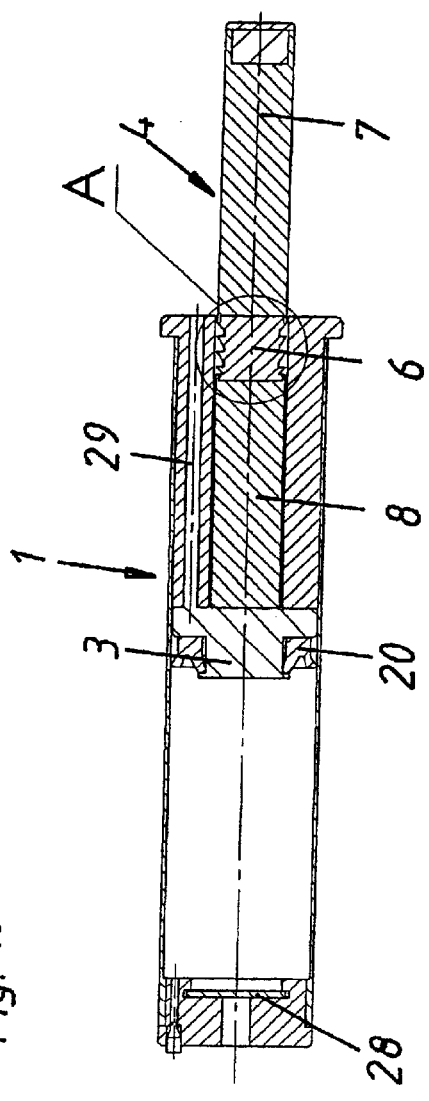
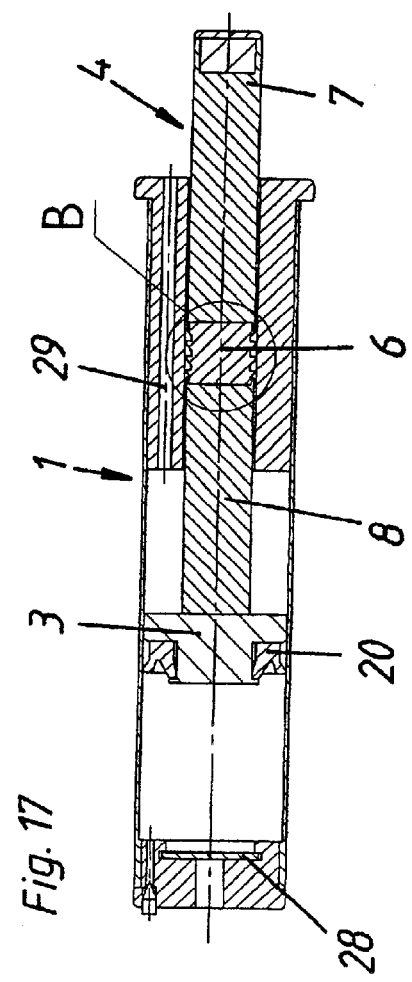

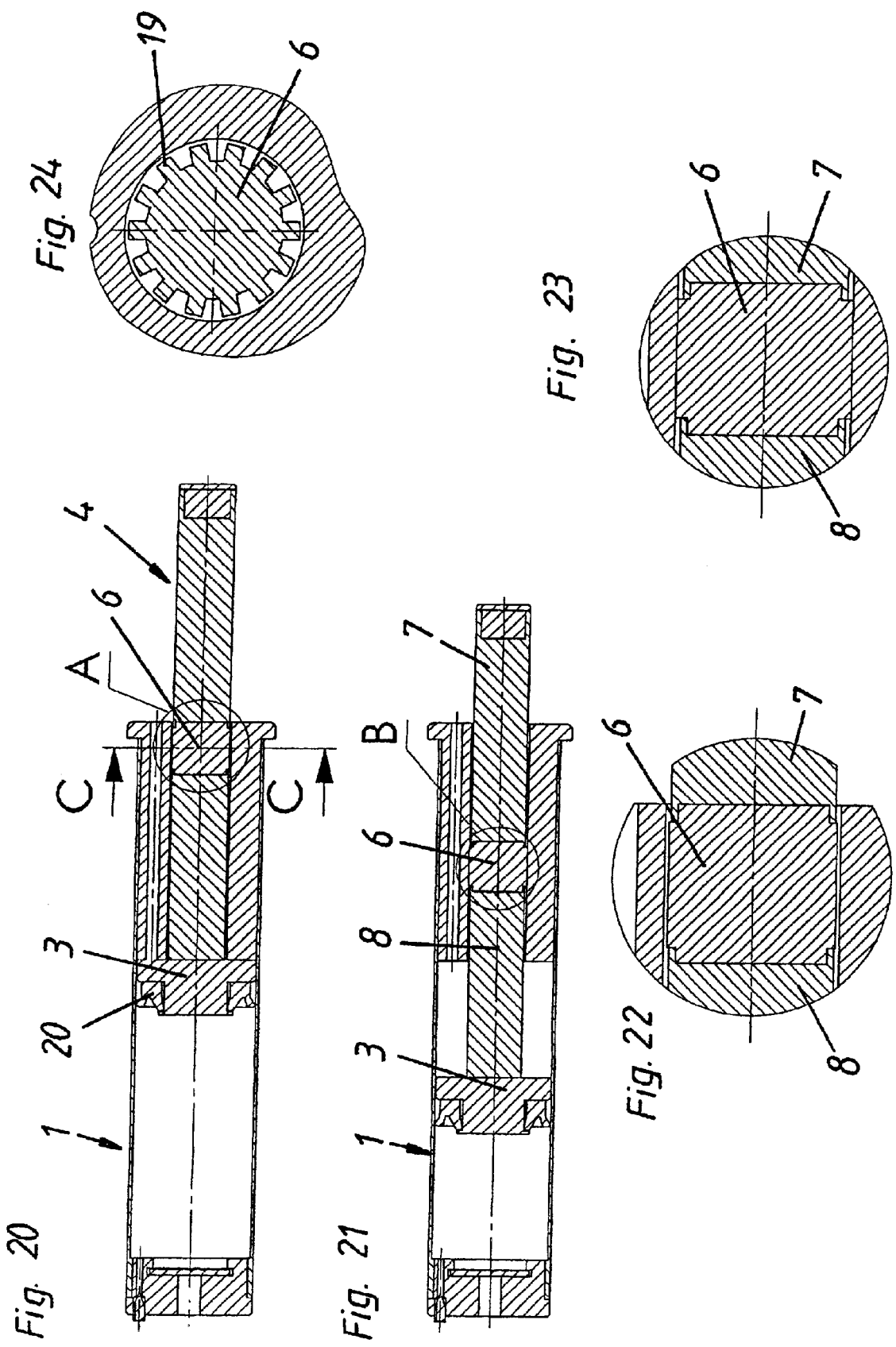

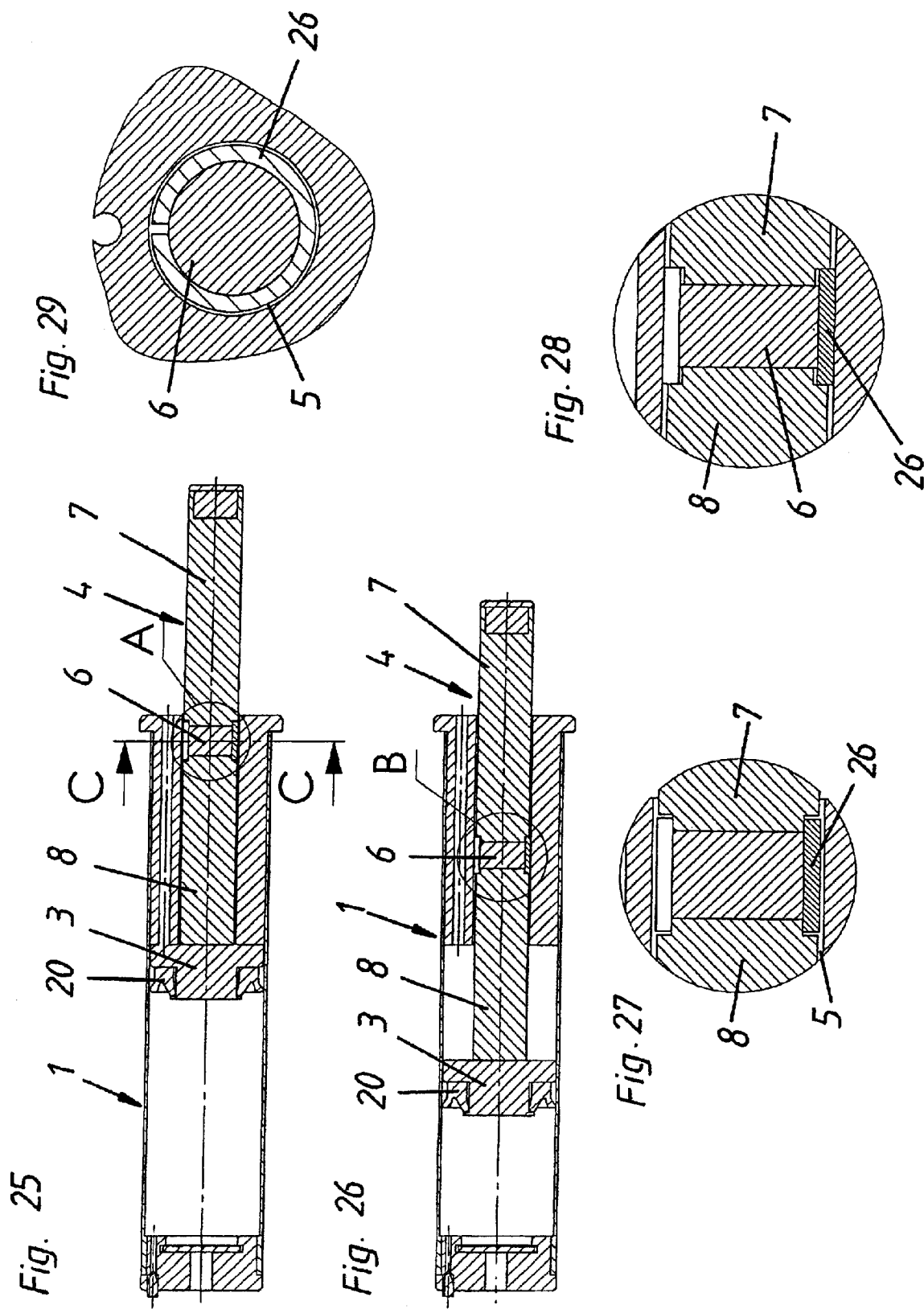

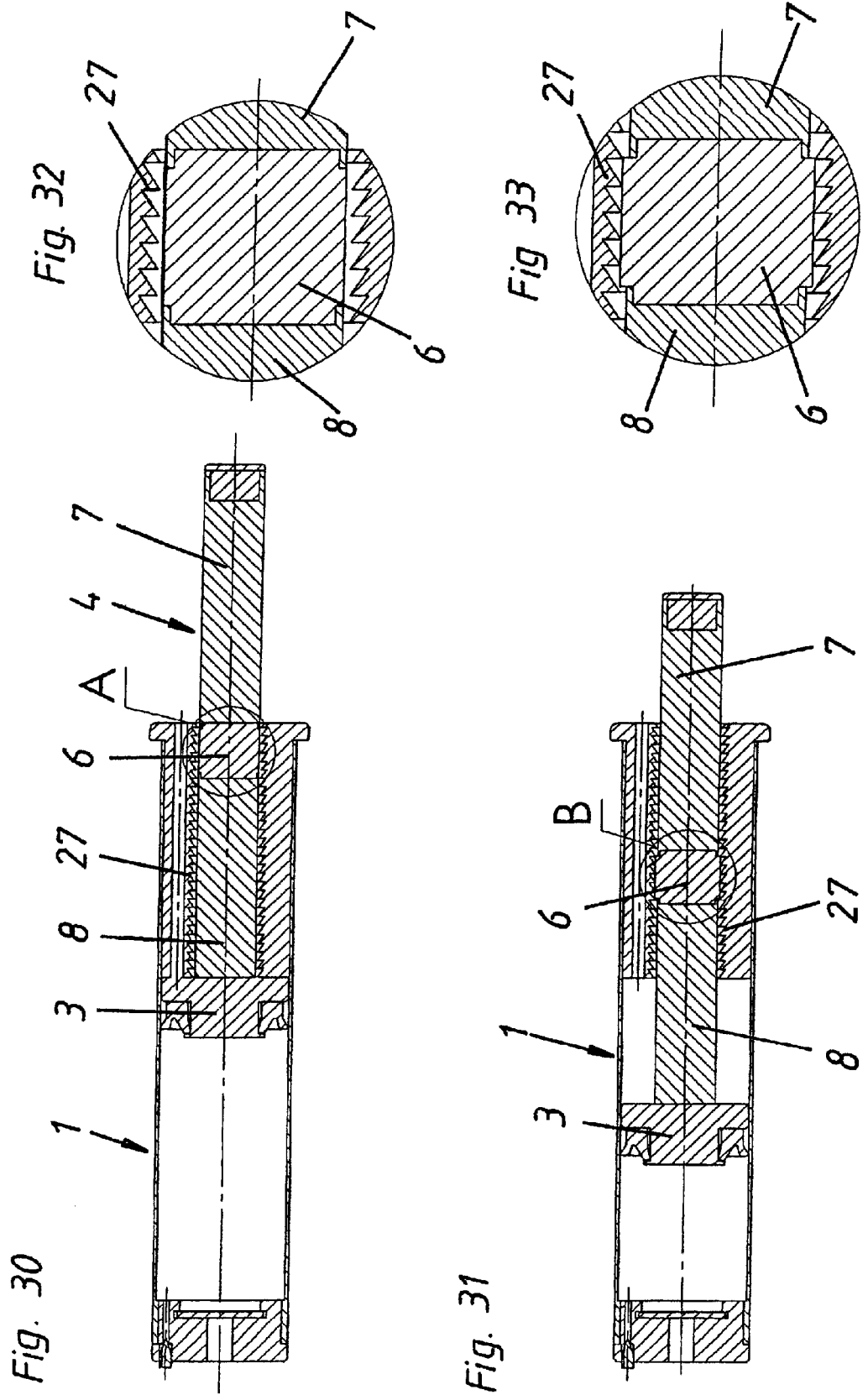

DAMPING MEANS, IN PARTICULAR FOR FURNITURE

BACKGROUND OF THE INVENTION

The invention relates to a damping apparatus, in particular for furniture, having a piston which is linearly displaceable in a cylinder chamber of a cylinder and is provided with a resiliently deformable piston part which is pressed against the cylinder wall during the damping procedure.

SUMMARY OF THE INVENTION

The object of the invention is to construct a damping means which is, in particular, suitable for damping the movement of furniture parts such that the damping action increases to its maximum value very rapidly in relation to the piston travel.

The object according to the invention is achieved in that the resiliently deformable piston part is located on a piston rod, which is attached to the piston. The piston rod is guided in a channel in the cylinder which has a smaller diameter than the piston, and the resiliently deformable piston part widens radially under axial compressive load and abuts against the wall of the channel.

Advantageously, a negative pressure is formed in the cylinder during the damping procedure, between the piston and the resiliently deformable piston part. So that the piston does not become stationary when the negative pressure and the friction on the one hand and the counteracting force on the pressure side of the piston are of the same size, in an example embodiment of the invention the piston is provided with at least one nozzle.

In a further example embodiment of the invention, there is provided in the cylinder wall an axial depression which forms an overflow point from a front chamber part to a rear chamber part when the piston is located in the region of the depression. Furthermore, it is possible to guide the piston in the cylinder chamber with a certain amount of play, so that a constant overflow from one chamber part to the other is ensured. It goes without saying that the play must be small enough not to prevent a negative pressure from being formed.

BRIEF DESCRIPTION OF THE DRAWINGS

Various example embodiments of the invention will be described below with reference to the figures in the attached drawings, in which:

FIG. 5 is a longitudinal section view through a further example embodiment of a damping means according to the invention, in the ready position;

FIG. 6 shows the detail A from FIG. 5;

FIG. 7 is a perspective view showing diagrammatically and in partial section, the piston of the damping means;

FIG. 8 is a longitudinal section view through a damping means according to FIG. 5 at the start of the damping movement;

FIG. 9 shows the detail A from FIG. 8;

FIG. 10 is a section view along the line I—I in FIG. 8;

FIG. 16 is a longitudinal section view through a further example embodiment of a damping means according to the invention, in which the piston is shown in the starting position or ready position;

FIG. 17 is a longitudinal section view through a damping means according to the invention, in which the piston is shown in the damping position;

FIG. 18 shows the detail A of FIG. 16;

FIG. 19 shows the detail B of FIG. 17;

FIG. 20 is a longitudinal section view through a further example embodiment of a damping means according to the invention, in which the piston is shown in the starting position or ready position;

FIG. 21 is a longitudinal section view through a damping means according to the invention, in which the piston is shown in the damping position;

FIG. 22 shows the detail A of FIG. 20;

FIG. 23 shows the detail B of FIG. 21;

FIG. 24 is a section along line C—C of FIG. 20;

FIG. 25 is a longitudinal section view through a further example embodiment of a damping means according to the invention, in which the piston is shown in the starting position or ready position;

FIG. 26 is a longitudinal section view through a damping means according to the invention, in which the piston is shown in the damping position;

FIG. 27 shows the detail A of FIG. 25;

FIG. 28 shows the detail B of FIG. 26;

FIG. 29 is a section view along line C—C of FIG. 25;

FIG. 30 is a longitudinal section view through a further example embodiment of a damping means according to the invention, in which the piston is shown in the starting position or ready position;

FIG. 31 is a longitudinal section view through a damping means according to the invention, in which the piston is shown in the damping position;

FIG. 32 shows the detail A of FIG. 30; and

FIG. 33 shows the detail B of FIG. 31;

DETAILED DESCRIPTION OF THE INVENTION

Figure 1:
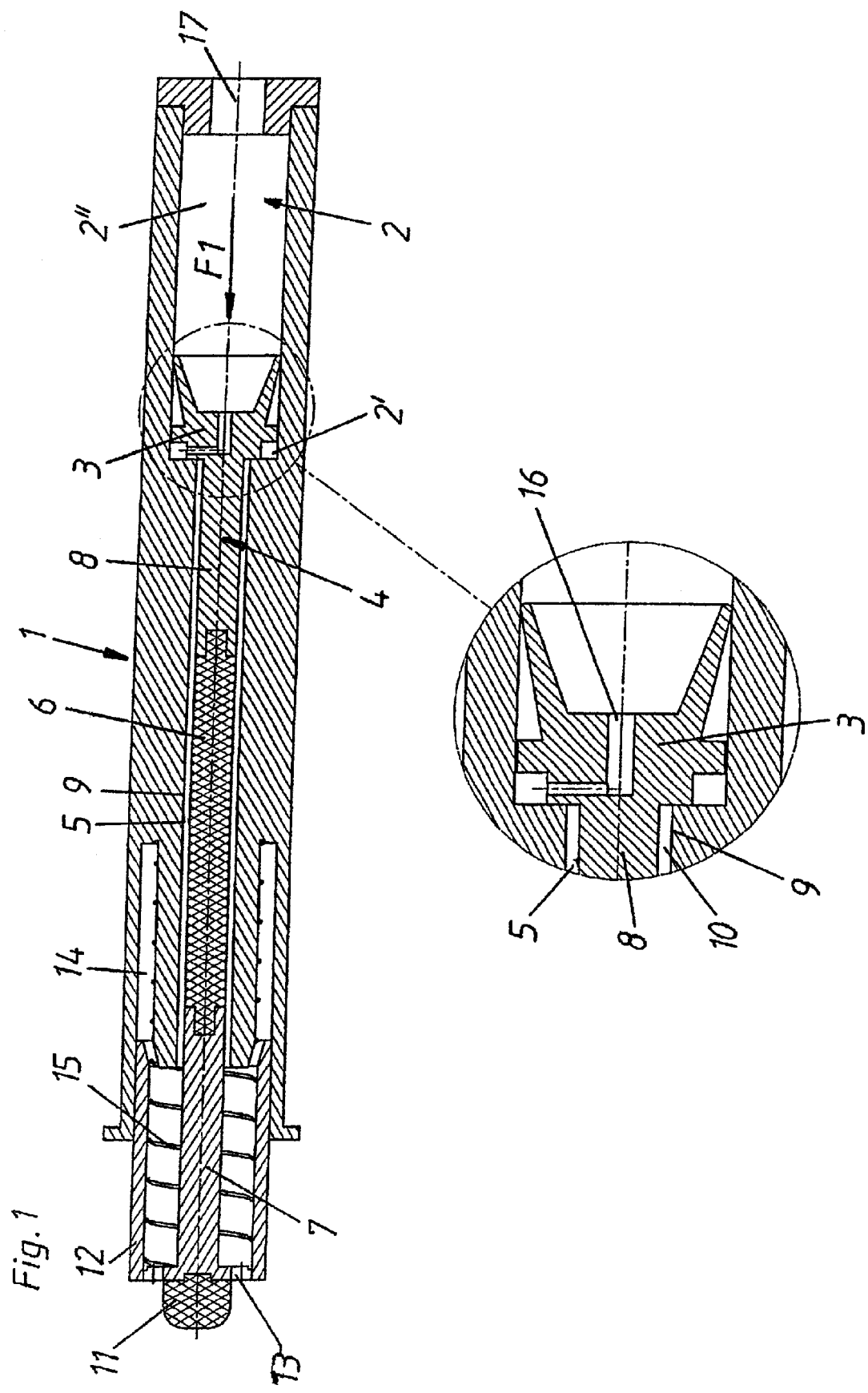
FIG. 1 is a longitudinal section view through a damping apparatus according to the invention, in which the piston is shown in the starting position or ready position.

The damping apparatus according to the invention has a cylinder 1 with a cylinder chamber 2 in which a piston 3 is linearly movable. The piston 3 divides the cylinder chamber 2 into a rear chamber part 2' and a front chamber part 2". Attached to the piston 3 is a piston rod 4 which projects through a channel 5 in the cylinder 1 and is part of the piston 3. The piston rod 4 is received in the channel 5 with play, so that the piston rod 4 and the channel wall 9 delimit an annular gap 10 when the piston 3 is in the rest position. The piston 3 is guided in the cylinder chamber 2 in a sealing manner.

The piston rod 4 comprises two rigid portions 7, 8 between which a resiliently deformable piston part 6 is arranged. The piston part 6 is constructed as a solid body from material with a rubber-like resilience. At its free end, the piston rod 4 includes a buffer 11 of resilient material and a covering cap 12 which has two air vents 13. The covering cap 12 is guided in an annular gap 14 in the cylinder 1, and a compression spring 15 is arranged within the covering cap 12 and moves the piston 3 into the starting position via the piston rod 4. The cylinder 1 has an air through-opening 17 (i.e., air vent) in its end face, through which air can flow into and out of the chamber part 2".

During damping, the furniture part (for example a door or a drawer) strikes against the buffer 11 of the piston rod 4 and presses the piston rod 4, together with the piston 3, to the right (in relation to the figures in the drawing). As soon as the piston 3 moves, a negative pressure is produced behind the piston 3 in the rear chamber part 2' of the cylinder chamber 2, even though air flows in through the through openings (air vents) 13 and through the annular gap 10 between the piston rod 4 and the wall 9 of the channel 5 into the chamber part 2'. Because the annular gap 10 is kept very narrow, the supply of air is very small.

Figure 2:
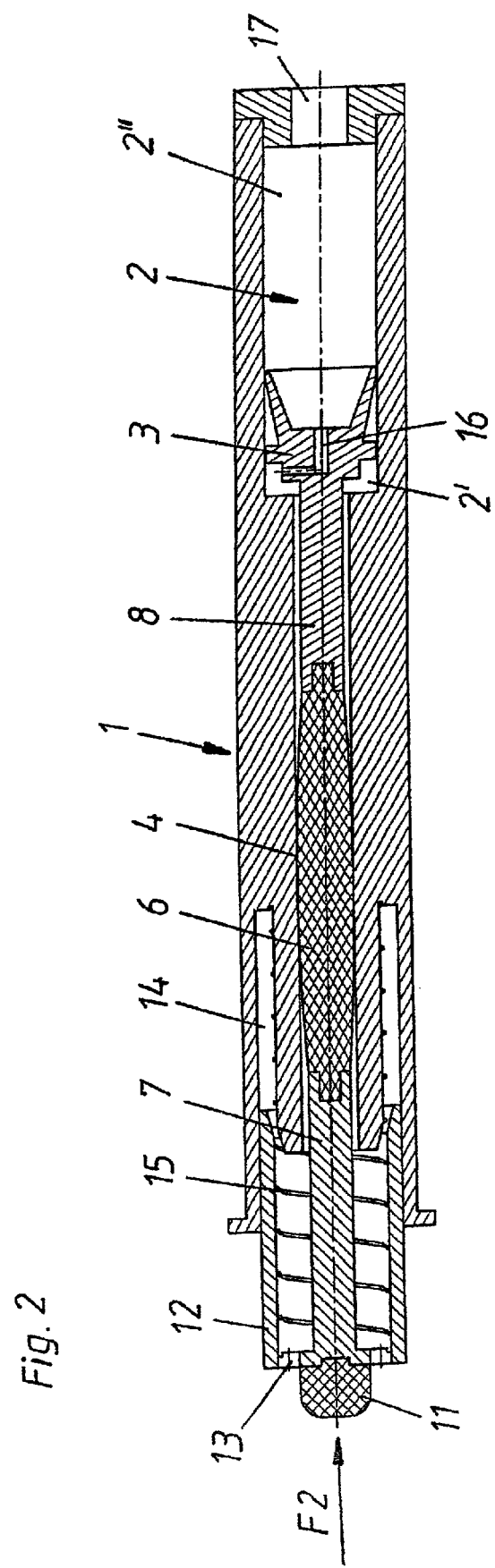
FIG. 2 is a longitudinal section view through a damping means (apparatus) according to the invention, in which the piston is shown in the damping position.

With a slow piston movement, enough air flows in and the piston 3 continues to move unimpeded. However, with a relatively fast piston movement, too little air flows through the annular gap 10 into the chamber part 2', and a negative pressure is produced behind the piston 3. This negative pressure generates a force F1 which counteracts the piston movement. As a result of this negative pressure, the resiliently deformable piston part 6 in the piston rod 4 is compressed. Thus, piston part 6 expands radially, as shown in FIG. 2, so that it is pressed against the wall 9 of the channel 5. This means the annular gap 10 is closed and further movement of the piston 3 is impeded both by the negative pressure in the chamber part 2' and by the friction between the middle piston part 6 and the wall 9.

Figure 3:
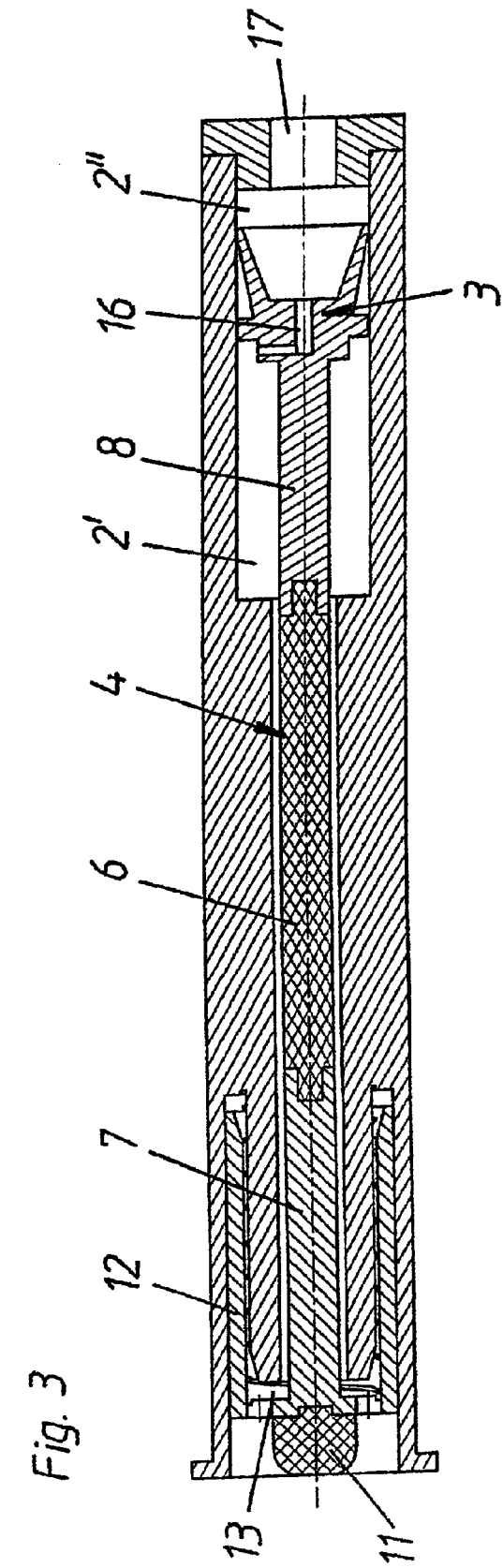
FIG. 3 is a longitudinal section view through a damping means according to the invention, in which the piston is shown in the end position.

If a force continues to act on the piston 3 in the direction of the arrow F2 in FIG. 2, the piston 3 may remain stationary, if a counteracting force F1 of the same size has built up as a result of the negative pressure and the friction. In order to prevent the piston 3 from remaining stuck in the middle of the cylinder chamber 2, the piston 3 has a nozzle 16, through which air can flow in to relieve the negative pressure in the chamber part 2'. This has the effect that the piston 3 can move on and be pressed to the end position shown in FIG. 3.

Once the system has been relieved of its load (for example, when the furniture door or the drawer is opened), the spring 15 pushes the piston 3, via the piston rod 4, back into the ready position shown in FIG. 1.

Figure 4:
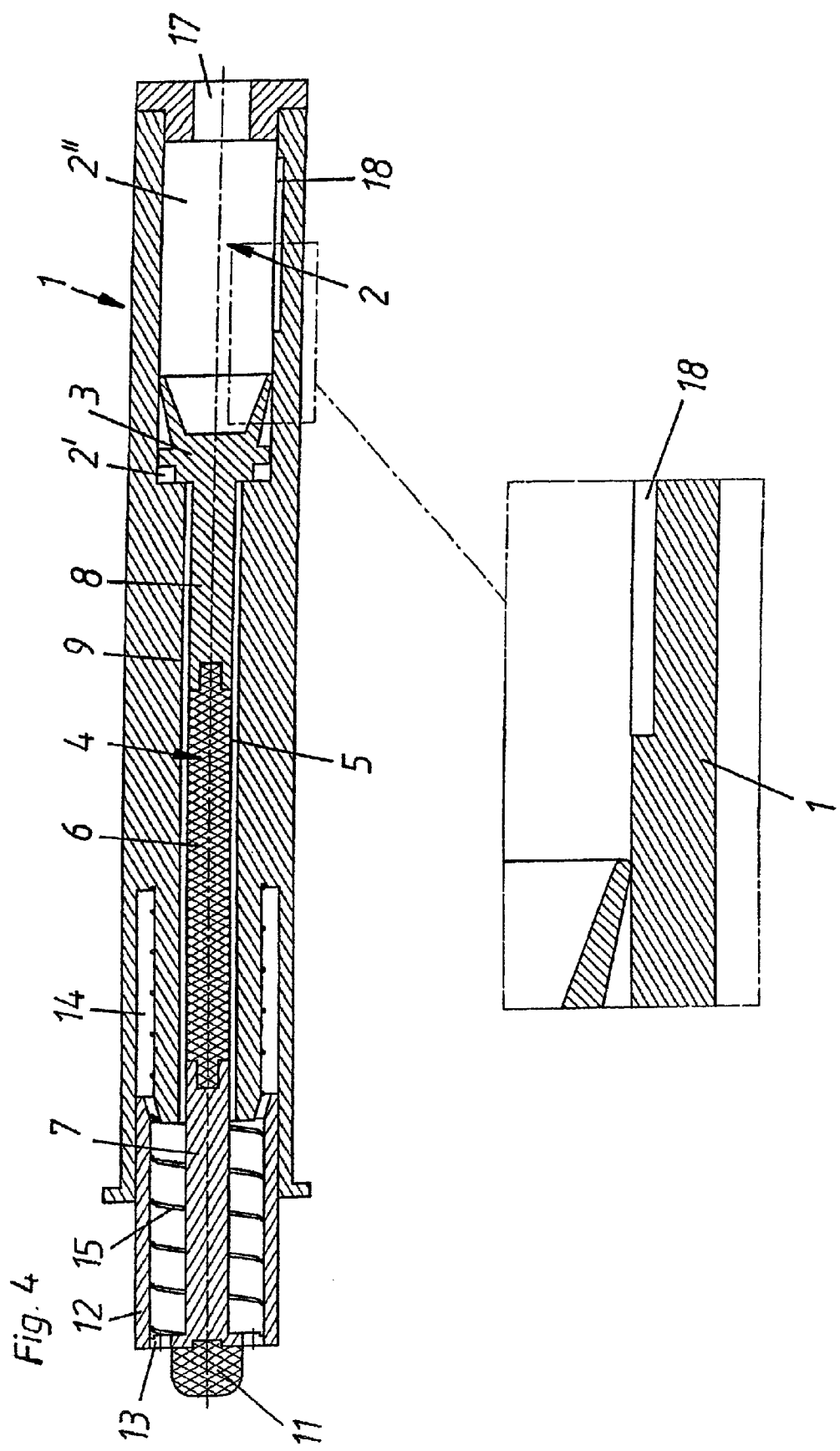
FIG. 4 is a longitudinal section view through a further example embodiment of a damping means according to the invention, in which the piston is shown in the starting position or ready position.
Figure 11:
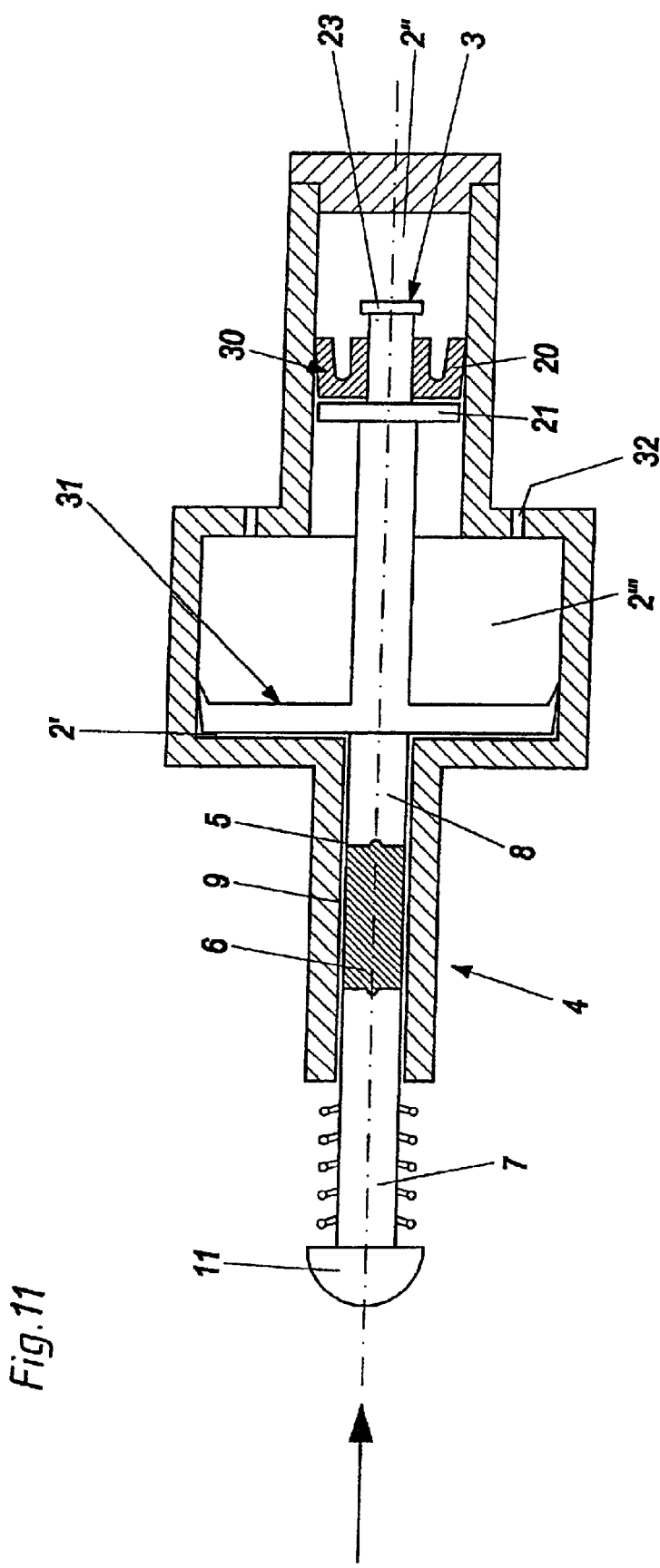
FIG. 11 is a longitudinal section view through a further example embodiment of a damping means in the ready position.
Figure 14:
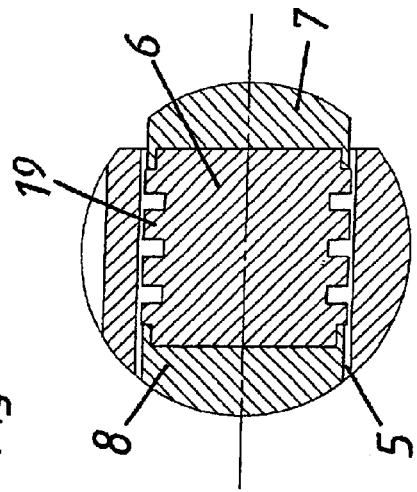
FIG. 14 shows the detail A of FIG. 12.
Figure 15:
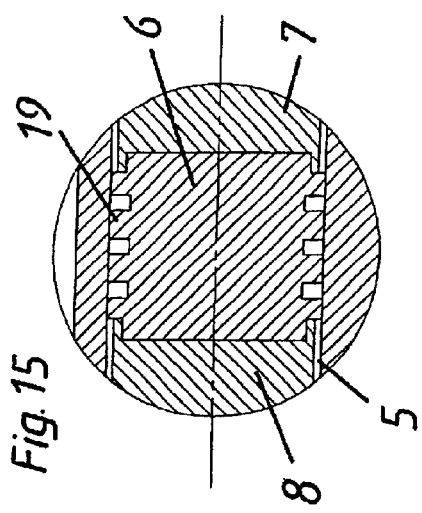
FIG. 15 shows the detail B of FIG. 13.
Figure 12:
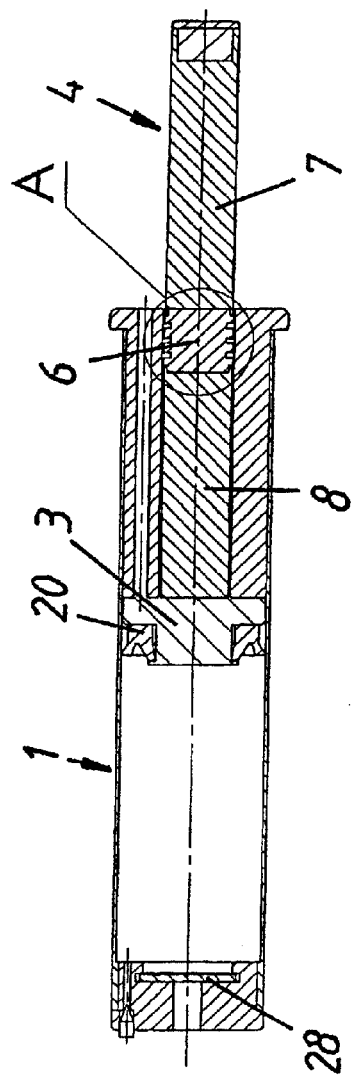
FIG. 12 is a longitudinal section view through a further example embodiment of a damping means according to the invention, in which the piston is shown in the starting position or ready position.
Figure 13:
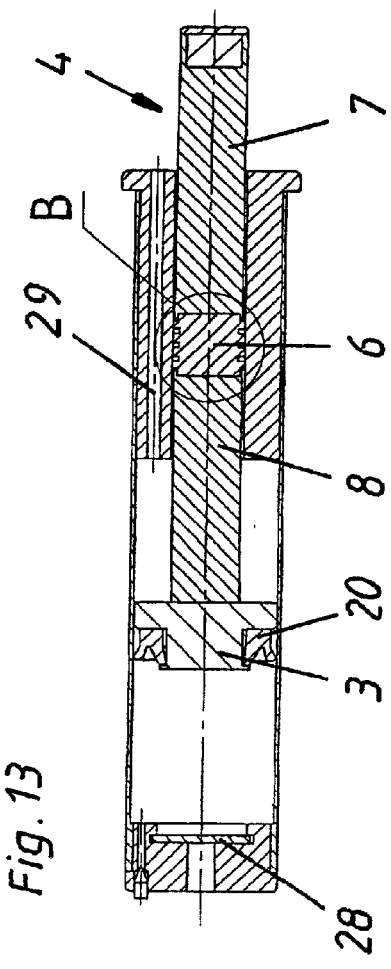
FIG. 13 is a longitudinal section view through a damping means according to the invention, in which the piston is shown in the damping position.

As a variant on the channel 16, there may be provided in the cylinder wall as shown in FIG. 4 a depression 18 which connects the two chamber parts 2' and 2". In this case, the relief of the negative pressure may be controlled in a manner dependent on the travel of the piston 3, by differing cross-sections in the depression 18.

With the damping apparatus according to the invention, doubling the volume of the chamber part 2' reduces the air pressure by a factor of 0.5. Consequently, only a very small piston travel is necessary, and the impeding action of the damping means begins very rapidly and increases very rapidly to the maximum value. The maximum impeding force is, however, limited by the negative pressure possible in the chamber part 2'. The pressure in chamber part 2" is neutral (unchanging) during the damping procedure.

In the example embodiment according to FIGS. 5 to 10, the piston 3 divides the cylinder chamber 2 into a rear negative-pressure chamber 2' and a front pressurized chamber 2". Here too, attached to the piston 3 is a piston rod 4 which projects through a channel 5 in the cylinder 1 and is part of the piston 3. The piston rod 4 is received in the channel 5 with play, so that the piston rod 4 and the channel wall 9 delimit an annular gap 10 when the piston 3 is in the rest position. The piston 3 is guided in the cylinder chamber 2 in sealing manner.

As in the example embodiment described previously, the piston rod 4 comprises two rigid portions 7, 8 between which a resiliently deformable piston part 6 is arranged. The piston part 6 is constructed as a solid body from material with a rubber-like resilience.

During damping, the furniture part (for example a door or a drawer) strikes against the buffer 11 of the piston rod 4 and presses the piston rod, together with the piston 3, to the right (in relation to the figures in the drawing). As soon as the piston 3 moves, a negative pressure is produced behind the piston 3 in the rear negative-pressure chamber 2' of the cylinder chamber 2, even though air flows in through the through openings (air vents) 13 and the annular gap 10 between the piston rod 4 and the wall 9 of the channel 5 into the negative-pressure chamber 2'. Because this annular gap 10 is kept very narrow, the supply of air is very small. During this piston movement, a sealing ring 20 abuts against a first disc 21 of the piston 3 in sealing manner and closes a groove 22 which forms part of the overflow channel. The pressurized chamber 2" and the negative-pressure chamber 2' are therefore separated. The sealing ring 20 is constructed in the manner of a piston sealing ring.

With a relatively fast piston movement, so little air flows through the annular gap 10 into the negative-pressure chamber 2' that a negative pressure is produced behind the piston 3. This negative pressure generates a force which counteracts the piston movement. This negative pressure is produced very rapidly, but can reach at most 1 bar (and that only in theory). However, it ensures that there is sudden and effective impeding of the furniture part.

The negative pressure also causes the resiliently deformable piston part 6 of the piston rod 4 to be compressed, whereupon this piston part 6 expands radially and is pressed against the wall 9 of the channel 5. This means the annular gap 10 is closed and further movement of the piston 3 is impeded both by the negative pressure in the negative-pressure chamber 2' and by the friction between the middle piston part 6 and the wall 9. At the same time, pressure is built up in the pressurized chamber 2". This takes place more slowly than the build-up of negative pressure in the negative-pressure chamber 2', but the forces which may be reached are larger.

If the piston 3 is moved forward slowly, the sealing ring 20 is raised slightly away from the disc 21 and enables air to emerge slowly from the pressurized chamber 2". Once the system has been relieved of its load (for example, when the furniture door or the drawer is opened) the spring 15 pushes the piston 3, via the piston rod 4, back into the ready position shown in FIG. 5. During this, the sealing ring 20 is raised markedly away from the groove 22, with the result that air can come in through the groove 22 in the first disc 21 and a groove 24 in the body of the piston 3 and finally through the slot 25 in a second disc 23 and into the cylinder space 2'.

In the example embodiment according to FIG. 1, the piston 30 of the pressurized chamber 2" and the piston 31 of the negative-pressure chamber 2' have different diameters. The pressurized chamber 2" is arranged in a stepped-down cylinder portion.

Between the negative-pressure chamber 2' and the pressurized chamber 2" there is a neutral chamber 2'" which is connected to the external air (atmosphere) by way of openings (air vent) 32.

During damping (that is to say when the piston 30, 31 is moving to the right) negative pressure is again built up in the negative-pressure chamber 2' and the piston part 6 is pressed against the wall 9 of the channel 5. Thus, the negative-pressure chamber 2' is sealed off, and damping is achieved by friction between the piston part 6 and the wall 9 of the channel 5, as well as the negative pressure.

The overflow point in the piston 30 is the same as in the piston 3 in the example embodiment described previously.

With the damping means according to the invention, doubling the volume of the negative-pressure chamber 2' reduces the air pressure by a factor of 0.5. Consequently, only a very small piston travel is necessary, and the impeding action of the damping means begins very rapidly and increases very rapidly.

As a result of the combination of the negative-pressure chamber 2' and the pressurized chamber 2", the damping begins very rapidly and a good damping profile is obtained.

To improve the grip between the resiliently deformable piston part 6 and the wall 9 of channel 5 during damping, the resiliently deformable piston part preferably has an uneven surface. Particularly, the cylindrical surface of the resiliently deformable piston part 6 is provided with ribs 19 which are, in the embodiment shown in FIGS. 12 to 19, annular ribs. The ribs can be rectangular or triangular in cross section as shown in FIGS. 12 to 19. During damping, the rigid portions 7, 8 of the piston rod 4 move towards each other as in the former embodiments, and the ribs 19 of the resiliently deformable piston parts 6 are pressed onto the wall 9 of the channel 5.

In the embodiment shown in FIGS. 20 to 24 the ribs 19 are arranged along the axial direction of the piston rod 4.

In the embodiment shown in FIGS. 25 to 29, the resiliently deformable piston part 6 is surrounded by a cylindrical sleeve 26. The material of the sleeve 26 is harder and more wear resistant than the material of the resiliently deformable piston part 6. The sleeve 26 is provided with a slot to allow radial expansion of the resiliently deformable piston part 6. The sleeve 26 can be sufficiently stiff in an axial direction to act as an abutment means for the rigid portions 7, 8 of the piston rod 4 during damping.

In the embodiment of FIGS. 30 to 33, the wall 9 of the channel 5 is provided with annular ribs 27. When the two rigid portions 7, 8 of the piston rod 4 are pushed together and the resiliently deformable piston part 6 is compressed in the axial direction and consequently pressed onto the wall 9 of the channel 5, the ribs 27 penetrate into the resilient material of the piston part 6 and the grip on the piston rod 4 is increased.

FIGS. 14, 18, 22 and 32 show the resiliently formable piston part 6 when there is no pressure acting on the piston rod 4. FIGS. 15, 19, 23 and 33 show the resiliently deformable piston part 6 during damping.

In the embodiment of FIGS. 12 to 33, the cylinder 1 is provided with a valve 28 and a 29. On the end of the piston rod 4 opposed to the piston 3, a magnet is provided which possible to easily move the piston 3 into its ready position after damping.

What is claimed is:

1. A damping apparatus comprising:
    a cylinder having a cylinder chamber and a channel communicating with said cylinder chamber;
    a piston arranged in said cylinder chamber so as to be linearly moveable therein; and
    a piston rod arranged in said channel and attached to said piston, said channel having a smaller cross section than said piston, said piston rod including a resiliently deformable part shaped and arranged to widen radially under an axial compressive load so as to abut against an inner wall of said channel.

2. The damping apparatus of claim 1, wherein said piston rod is arranged in said channel with play when said resiliently deformable part is not under an axial compressive load so as to abut against an inner wall of said channel.

3. The damping apparatus of claim 1, wherein said piston rod further includes a first rigid portion and a second rigid portion, said resiliently deformable part being located between said first rigid portion and said second rigid portion.

4. The damping apparatus of claim 1, wherein said resiliently deformable part comprises a solid rubber body.

5. The damping apparatus of claim 1, wherein said piston rod has a first end connected to said piston and has a second end opposite said first end, said piston rod further including a covering cap at said second end, said covering cap having at least one through-opening formed therein.

6. The damping apparatus of claim 1, wherein said piston is arranged in said cylinder chamber so as divide said cylinder chamber into two chamber sections, said piston having a nozzle for allowing said two chamber sections to communicate with each other.

7. The damping apparatus of claim 1, wherein said piston is arranged to seal against an inner wall of said cylinder chamber, and said resiliently deformable part is operable to widen radially so as to seal against said inner wall of said chamber under the axial compressive load so that a negative pressure is developed in said cylinder between said piston and said resiliently deformable part when the axial compressive load is applied to said piston rod.

8. The damping apparatus of claim 7, wherein said inner wall of said cylinder chamber has at least one axially-extending depression.

9. The damping apparatus of claim 7, wherein said piston is arranged in said cylinder chamber so as divide said cylinder chamber into two chamber sections, further comprising at least one overflow channel arranged between said two chamber sections for controlling flow therebetween.

10. The damping apparatus of claim 1, wherein said piston comprises a first piston, further comprising a second piston arranged in said cylinder chamber, said first piston and said second piston being arranged to divide said cylinder chamber into a pressurized chamber section, a negative-pressure chamber section, and a neutral-pressure chamber section between said first piston and said second piston, further comprising at least one overflow channel arranged between said pressurized chamber section and said neutral-pressure chamber section for controlling flow therebetween.

11. The damping apparatus of claim 10, wherein said negative-pressure chamber section and said pressurized chamber section have different diameters.

12. The damping apparatus of claim 11, wherein said first piston is arranged between said negative-pressure chamber section and said neutral-pressure chamber section, and said second piston is arranged between said neutral-pressure chamber section and said pressurized chamber section, a diameter of each of said negative-pressure chamber section and said first piston being larger than a diameter of each of said pressurized chamber section and said second piston.

13. The damping apparatus of claim 10, wherein said first piston is arranged between said negative-pressure chamber section and said neutral-pressure chamber section, said resiliently deformable part being located on a negative-pressure chamber section-side of said first piston opposite said second piston.

14. The damping apparatus of claim 1, wherein said resiliently deformable part has an uneven surface.

15. The damping apparatus of claim 14, wherein said resiliently deformable part has a ribbed outer surface.

16. The damping apparatus of claim 15, wherein said resiliently deformable part has a ribbed outer surface with annular ribs.

17. The damping apparatus of claim 15, wherein at least one of said annular ribs has a triangular cross-section.

18. The damping apparatus of claim 15, wherein said resiliently deformable part has a ribbed outer surface with axially-extending ribs.

19. The damping apparatus of claim 1, further comprising a cylindrical sleeve surrounding said resiliently deformable part.

20. The damping apparatus of claim 19, wherein said cylindrical sleeve has a slot.

21. The damping apparatus of claim 19, wherein said piston rod further includes a first rigid and a second rigid portion, said resiliently deformable part being located between said first rigid portion and said second rigid portion, said cylindrical sleeve being arranged so as to abut against each of said first rigid portion and said second rigid portion.

22. The damping apparatus of claim 19, wherein said cylindrical sleeve is formed of a harder and more wear-resistant material than said resiliently deformable part.

23. The damping apparatus of claim 1, wherein said inner wall of said channel has annular ribs.

24. The damping apparatus of claim 23, wherein each of said annular ribs has a saw-tooth cross section.

* * * * *

UNITED STATES PATENT AND TRADEMARK OFFICE
Certificate

Patent No. 6,799,663 B2            Patented: October 5, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Fredi Dubach, Bäretwil (CH); and Krammer Bernhard, Höchst (AT).

Signed and Sealed this Twenty-fifth Day of November 2014.

<div style="text-align:right">

ROBERT SICONOLFI
*Supervisory Patent Examiner*
Art Unit 3657
Technology Center 3600

</div>